Holt & Secombe.
Hand Printing & Dating Stamps.

No. 111,844.　　　　　　　Patented Feb. 14, 1871.

Witnesses
Marcus P. Norton
Orville A. Dick

Inventor
Horace Holt.
Wm. W. Secombe.
By their Attorneys
Opperman & Johnson

UNITED STATES PATENT OFFICE.

HORACE HOLT AND WILLIAM W. SECOMBE, OF NEW YORK, N. Y., ASSIGNORS TO SECOMBE MANUFACTURING COMPANY, OF SAME PLACE.

IMPROVEMENT IN HAND-STAMPS.

Specification forming part of Letters Patent No. 111,844, dated February 14, 1871.

*To all whom it may concern:*

Figure 1:
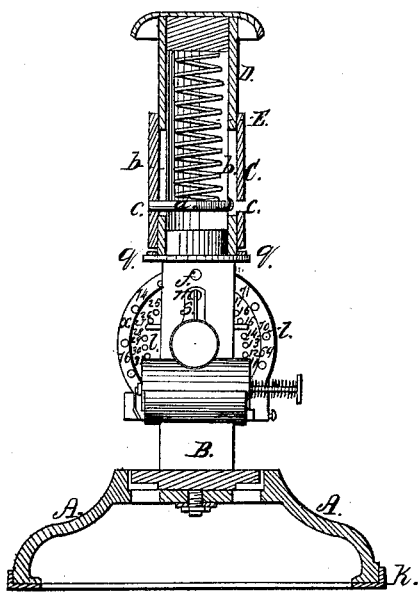
Figure 3:
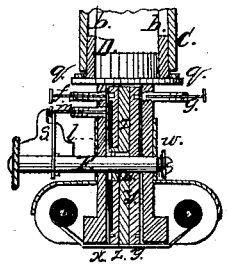
Figure 2:
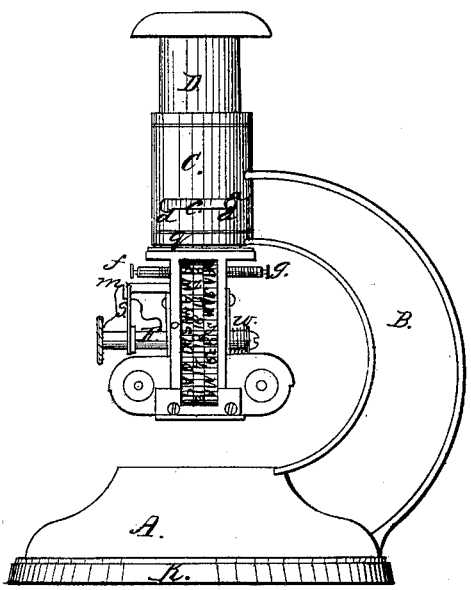

Be it known that we, HORACE HOLT and WILLIAM W. SECOMBE, of the city, county, and State of New York, have invented certain new and useful Improvements in Hand Printing and Dating Stamps, of which the following is a specification:

In the drawing, Figure 1 represents a partial sectional and front elevation of a hand-stamp embracing our invention. Fig. 2 represents a side elevation of the same. Fig. 3 represents a vertical section of the stamp-head, the spindle being shown as withdrawn, so as to disconnect it from the front disk, but maintaining its connection with the intermediate disk; and Fig. 4, a similar section, showing the three disks locked together and to the stamp-head.

From the base A of the stamp an arm, B, rises, the end of which forms a socket or guide, C, for the shank or stem D, which carries the stamp-head. The shank or stem D is made tubular, to receive a coiled spring, E, which rests upon a horizontal pin, $a$, so that the descent of the stamp-head will compress the spring, and the latter will thereby elevate the former when released. This pin $a$ works in a longitudinal slot, $b$, in the tubular shank or stem D, and thereby allows of the rising-and-falling motion of the stamp-head. The shank or stem also has a limited capacity to turn or swivel in its socket in order to change the position of the stamp-head from the front to the side of the stamp; and, in this connection, the ends of the pin $a$ extend into and through horizontal segmental slots $c$, formed in the guide or socket C, so that their ends form stops to limit the turning or swiveling movement of the stamp-head over an arc of ninety degrees, to operate either from the front or side of the base. The ends of these slots $c$ are provided with depressions $d$, Fig. 2, into which the pin $a$ drops, and is held therein by the action of the spring E, so as to lock the stamp-head in either extreme of its swiveling movement.

Figure 4:
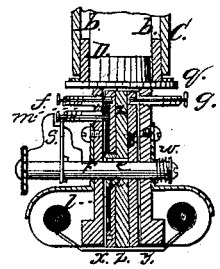

The printing and dating disks are arranged between the forked end of the shank or stem D upon a horizontal spindle, F, so that the two outside ones, $x$ and $y$, can be turned independently of each other and the spindle, while the intermediate one, $z$, can only turn with said spindle, being locked therewith by a pin, $e$, Figs. 3 and 4, fitting a groove, $i$, in the hub $u$ of said disk $z$, so as to allow the spindle F to have an axial movement independent of all the disks, but maintain its connection with the intermediate one, as shown in Figs. 3 and 4 of the drawing. The two outside disks, $x$ and $y$, are locked, when adjusted to the shank or stem, by spring-pins $f$ and $g$ entering one of a series of holes in said disks corresponding to the months and years thereon. The front disk, $x$, has its bearing upon the hub $u$ of the intermediate one, and has a recess in its outer face to receive a thin disk, $l$, fitted upon and locked with the hub. This thin disk $l$ is of less diameter than the front one, and is provided with holes $n$, into any one of which a spring-pin, $m$, carried by an arm, $s$, on the spindle, enters to lock the intermediate disk to the stamp-head, and thereby hold it from turning out of adjustment while adjusting or changing the position of the indicating dates or months of the outer disks, and thus the intermediate disk may be held fast while adjusting the others by applying the fingers to their outer faces; or it may be adjusted by the spindle or stem while the others are held fast by their spring-pins, and in this way avoid the inconvenience of having to adjust the middle disk, $z$, by applying the fingers or any instrument to its circumference.

The arm $s$, which carries the spring-pin $m$ of the middle disk, is fitted upon the spindle F, so that the latter can turn independently of said arm $s$, while the latter, with its pin $m$, must move in and out with said spindle, which, when drawn out and released, is retracted by a spring, $w$, at its inner end.

The inking-ribbon is secured to the stamp-head, inclosed, and operated in the usual or any convenient manner.

A rubber or other bearing, $q$, is fitted upon the shank or stem D, between the stamp-head and the lower end of the guide-socket C, to relieve the rebound of the spring.

A flanged elastic shoe or band $h$, may be sprung over and fitted to the base for the purpose of deadening the jar, and of relieving the liability of the stamp to jump or move about under the blows in operating the stamp, and also to protect the desk or article of furniture from injury.

Having described our invention, we claim—

1. The intermediate disk, locked and unlocked by a device connected to or carried by the stem or spindle by which said disk is operated.

2. The combination of the locking and unlocking device s m of the intermediate disk or type-wheel with a stem or spindle, F, having an axial and revolving motion, and with the stamp-head, as herein described and set forth.

3. The segmental slot or slots c in the socket or guide C of a hand-stamp, in combination with the pin a, for limiting the turning or swiveling movement of the stamp-head, as described.

4. The depressions d at the ends of the slot or slots c, to form seats for the pin to hold it and the stamp-head in either of the extreme positions in which the latter may be adjusted, as described.

5. The combination of the segmental slot or slots c, pin a, spring E, tubular shank D, and socket or guide C, constructed and operating substantially as described.

In testimony whereof we have hereunto set our hands.

HORACE HOLT.
W. W. SECOMBE.

Witnesses:
M. M. LIVINGSTON,
T. B. BEECHER.